United States Patent [19]
Thompson et al.

[11] Patent Number: 5,699,210
[45] Date of Patent: Dec. 16, 1997

[54] DISK DRIVE FOR RECEIVING A REMOVABLE CARTRIDGE AND METHOD OF INSERTING THE CARTRIDGE

[75] Inventors: Herbert E. Thompson; Bin-Lun Ho, both of Los Gatos; Albert J. Guerini, Gilroy; Teong-Hoe Kay, San Jose; Syed H. Iftikar, Fremont, all of Calif.

[73] Assignee: Syquest Technology, Inc., Fremont, Calif.

[21] Appl. No.: 615,080

[22] Filed: Mar. 13, 1996

Related U.S. Application Data

[60] Provisional application No. 60/006,635, Nov. 13, 1995.
[51] Int. Cl.$^6$ .......................... G11B 17/04; G11B 33/02
[52] U.S. Cl. ........................ 360/99.06; 360/99.02; 369/75.1
[58] Field of Search ........................ 360/99.06, 99.02; 369/75.1

[56] References Cited

U.S. PATENT DOCUMENTS

| | | | |
|---|---|---|---|
| 5,046,170 | 9/1991 | Oshima et al. | 360/99.02 X |
| 5,243,480 | 9/1993 | Tangi et al. | 360/99.02 |
| 5,504,730 | 4/1996 | Kanada | 360/99.6 X |
| 5,513,054 | 4/1996 | Watanabe | 360/99.06 |
| 5,537,377 | 7/1996 | Takai et al. | 360/99.02 X |

*Primary Examiner*—John H. Wolff
*Attorney, Agent, or Firm*—Lyon & Lyon LLP

[57] ABSTRACT

A removable cartridge disk drive includes a removable cartridge adapted to be received by a disk drive having a base plate and right and left guide walls. The cartridge inserts into the drive at an angle with the aid of a movable slider attached to one of the guide walls. Once inserted, the cartridge is locked in and held. During operation, a rotary actuator arm with adjustable angular orientation loads one or more read/write heads off of a fixed ramp onto the surface of a data storage disk contained inside the cartridge. After read/write operations are finished, the head is unloaded onto the fixed ramp and the cartridge is ejected from the drive at an angle.

24 Claims, 14 Drawing Sheets

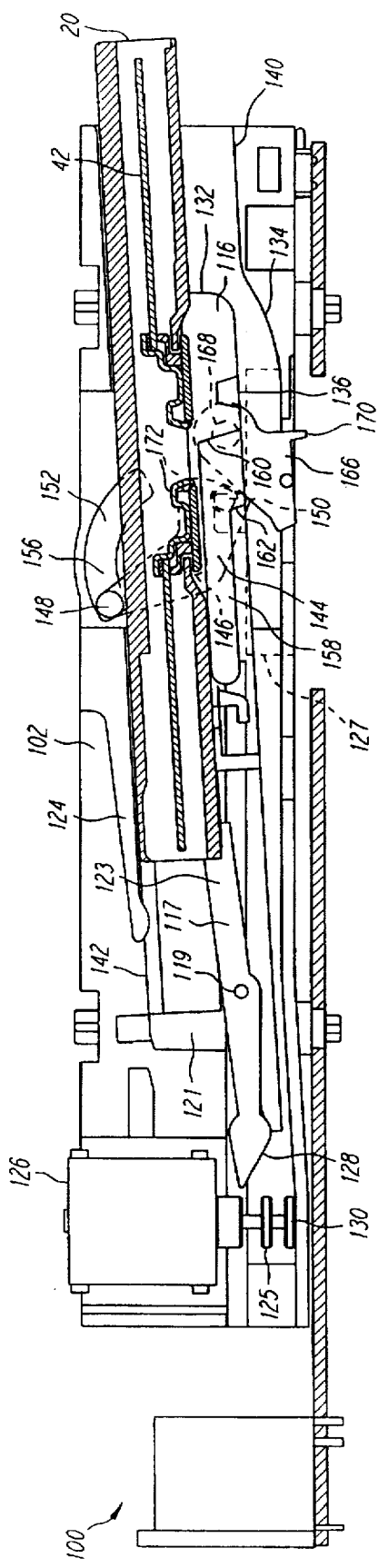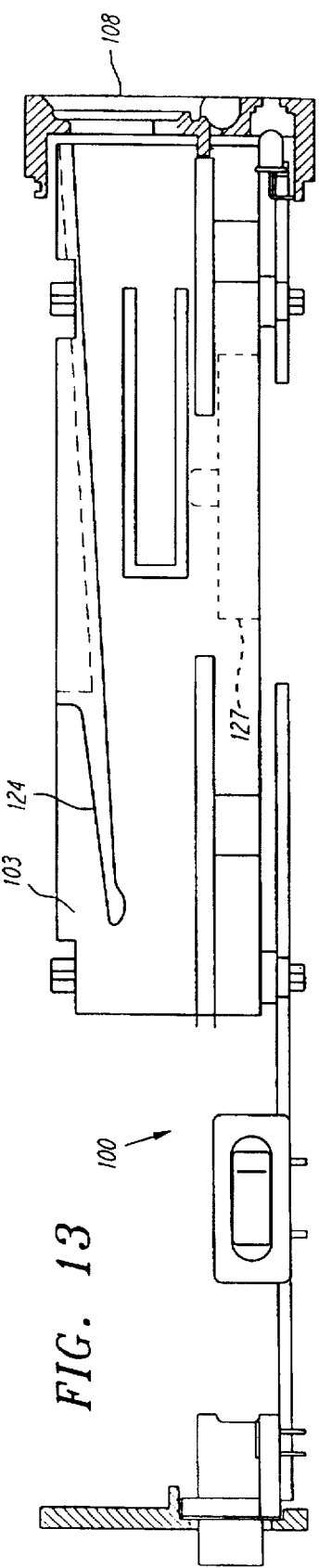

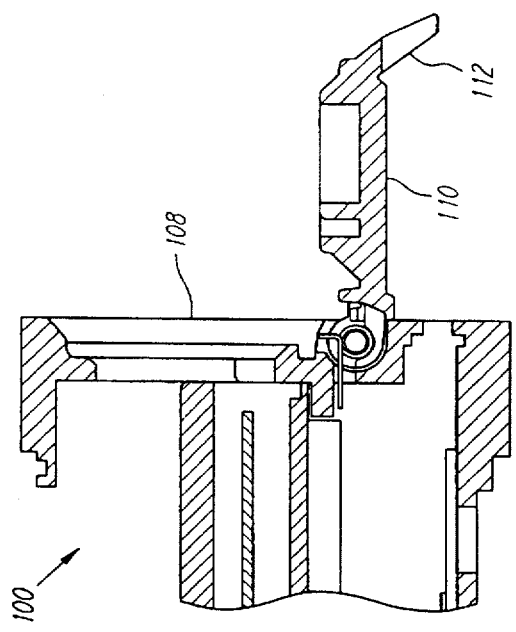
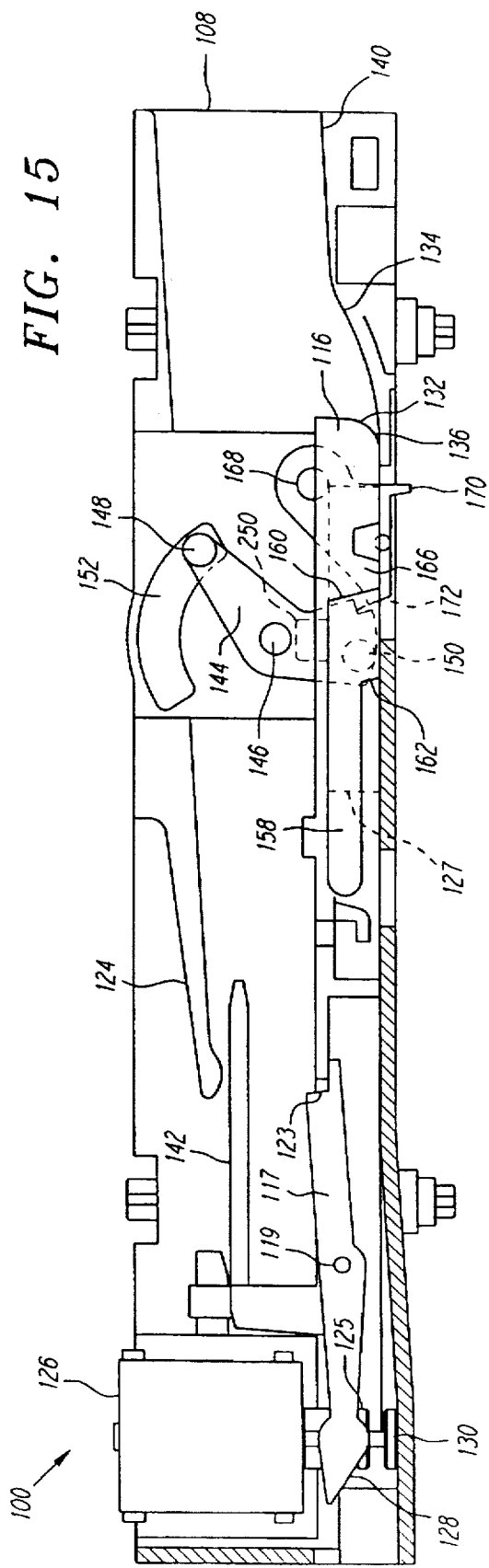

DISK DRIVE FOR RECEIVING A REMOVABLE CARTRIDGE AND METHOD OF INSERTING THE CARTRIDGE

CROSS REFERENCE TO RELATED APPLICATION

This non-provisional application claims the benefit of U.S. Provisional application Ser. No. 60/006,635, which was filed on Nov. 13, 1995.

FIELD OF THE INVENTION

The present invention is directed to a disk drive capable of receiving and accessing a removable cartridge containing a data storage disk.

BACKGROUND OF THE INVENTION

There is a growing demand for powerful yet inexpensive portable computers capable of high memory capacity. A known method of achieving high memory capacity is to employ a removable cartridge disk drive. In such a disk drive, any number of removable cartridges can be used to store as much data as is required for use with the computer. Additionally, this data can be secured in a safe location remote from the computer in order to ensure the confidentiality of the data when the computer is not in use. To minimize the cost of such a disk drive, speed and efficiency of manufacture are essential. Thus, it is desirable to construct the disk drive so that it uses as few moving parts as possible in receiving an inserted cartridge.

Traditionally, removable cartridge disk drives have been constructed such that after the cartridge is inserted the drive engages it in one of two ways: Either (1) the cartridge is received and subsequently lowered onto the spindle motor of the drive; or (2) the cartridge is received and then the spindle motor moves upward to engage it. Such designs have generally proven effective in keeping down the number of moving parts used and allowing the removable cartridge and disk drive to be as compact as possible. However, in light of the ever increasing demand for lower costs in conjunction with higher data storage capacity, it is necessary to further reduce the number of components used.

It is known in the art to construct a disk drive that uses a rotary actuator arm which accesses the removable cartridge and carries read/write transducer heads over the surface of the disk contained in the cartridge. Traditionally, the heads have been loaded onto the disk, or unloaded off of it, by means of a movable ramp. Although use of a fixed ramp is desirable from a manufacturing standpoint, it has proven necessary to use a movable ramp for the following reasons. If the ramp were fixed, it would either have to be made extremely thin so as to fit between the head and the surface of the disk, which would render the ramp too fragile, or have to be constructed with a forked end to encompass the perimeter of the disk, which would add to manufacturing cost.

For the foregoing reasons, there is a need for a disk drive that minimizes the number of parts utilized in receiving, holding, accessing, and ejecting a removable cartridge; allows a fixed ramp to be used for loading and unloading the read/write transducer heads; and frees the actuator arm to rotate far enough to place the heads outside the cartridge and beyond the perimeter of the disk.

SUMMARY OF THE INVENTION

The present invention is directed to an apparatus that satisfies this need. A removable cartridge disk drive having features of the instant invention comprises side walls, a base, and a cartridge receiving area into which a removable cartridge containing a data storage disk can be inserted. The removable cartridge is specifically inserted into the drive at an angle relative to the base by means of a movable slider attached to one side wall of the disk drive.

In a first, separate aspect of the invention, the removable cartridge is ejected from the disk drive at an angle relative to the base by releasing the movable slider from a locked position.

In a second, separate aspect of the invention, the removable cartridge is locked into a horizontal position to engage the disk drive and is held in place by an overcenter link mechanism whose movement is driven by the movement of the slider as the cartridge is inserted into the disk drive.

In a third, separate aspect of the invention, the disk drive is constructed to allow a fixed ramp surface to communicate with a transducer head load/unload wire while the transducer heads are still positioned over the surfaces of the disk.

In a fourth, separate aspect of the invention, the disk drive has a simplified voice coil motor with enhanced angular motion so that the actuator arm can rotate far enough to carry the transducers completely outside the interior of the removable cartridge.

In a fifth, separate aspect of the invention, air filters are advantageously placed so that the pressure differential in the spindle area caused by the spinning action of the disk results in a flow of clean air from the bottom of the baseplate to the top of the disk to continuously purge the disk drive of contaminants.

BRIEF DESCRIPTION OF THE DRAWINGS

These and other features, aspects, and advantages of the present invention will become better understood with regard to the following description, appended claims, and accompanying drawings wherein:

FIG. 12 shows a partial internal left side view of the disk drive of FIG. 9, including the cartridge in a position not fully inserted;

FIG. 13 shows a partial right side view of the disk drive of FIG. 9, illustrating the angular direction of insertion;

FIG. 14 shows a partial left side view of the disk drive of FIG. 9, depicting the disk drive door in the open position;

FIG. 15 shows a partial internal left side view of the disk drive of FIG. 9, including the internal mechanisms depicted as if the cartridge were fully inserted to engage the disk drive;

DETAILED DESCRIPTION OF THE PREFERRED EMBODIMENTS

Figure 1:
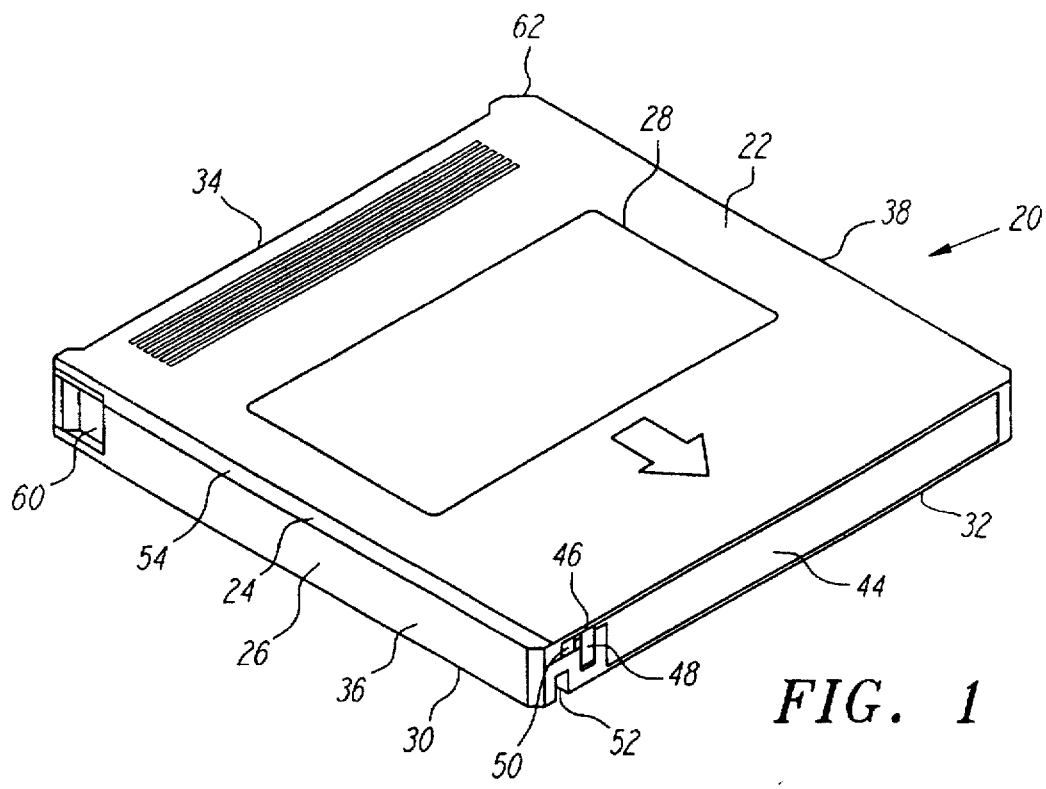
FIG. 1 shows a perspective view of a cartridge used in a disk drive having features of the present invention, with the door in the closed position.

FIG. 1 depicts a preferred embodiment of a removable cartridge 20 used in a disk drive having features of the instant invention. The cartridge 20 includes an outer housing 22, with a top portion 24 secured to a bottom portion 26. Preferably, these portions are molded out of tough, durable engineering plastic, e.g., a polycarbonate such as LEXAN.

The top portion 24 includes a top surface 28, and the bottom portion 26 includes a bottom surface 30. The top portion 24 and bottom portion 26 are secured together to define a door or port end 32, a back end 34, a first connecting end 36 and a second connecting end 38. These first and second connecting ends 36, 38 connect the door end 32 to the back end 34. With reference to FIG. 1, the top and bottom surfaces 28, 30 are substantially parallel to each other and to a data storage disk 42 contained in the cartridge 20. The ends 32, 34, 36, and 38 are substantially perpendicular to the top and bottom surfaces 28, 30. Removable cartridge 20 is more fully disclosed in U.S. Pat. Nos. 5,218,503 and 5,280,403, both of which patents are assigned to the assignee of the present invention and fully incorporated herein by reference.

Figure 2:
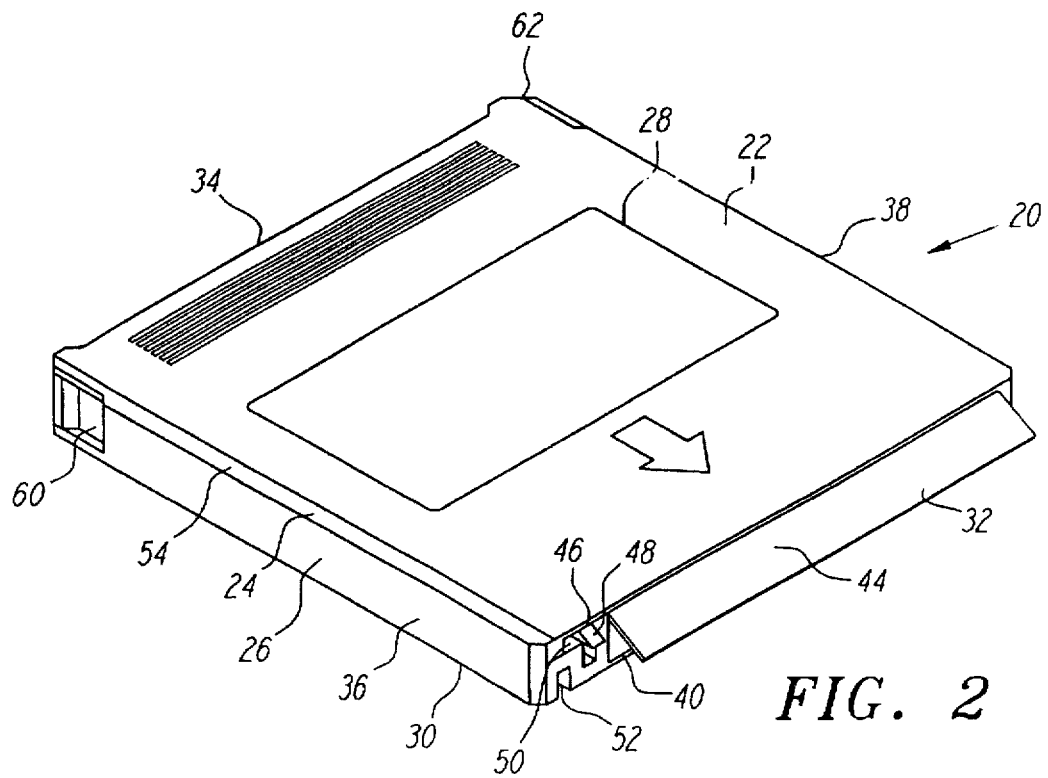
FIG. 2 shows a perspective view of the cartridge of FIG. 1, with the door in a semi-opened position between the fully closed and fully opened positions.
Figure 3:
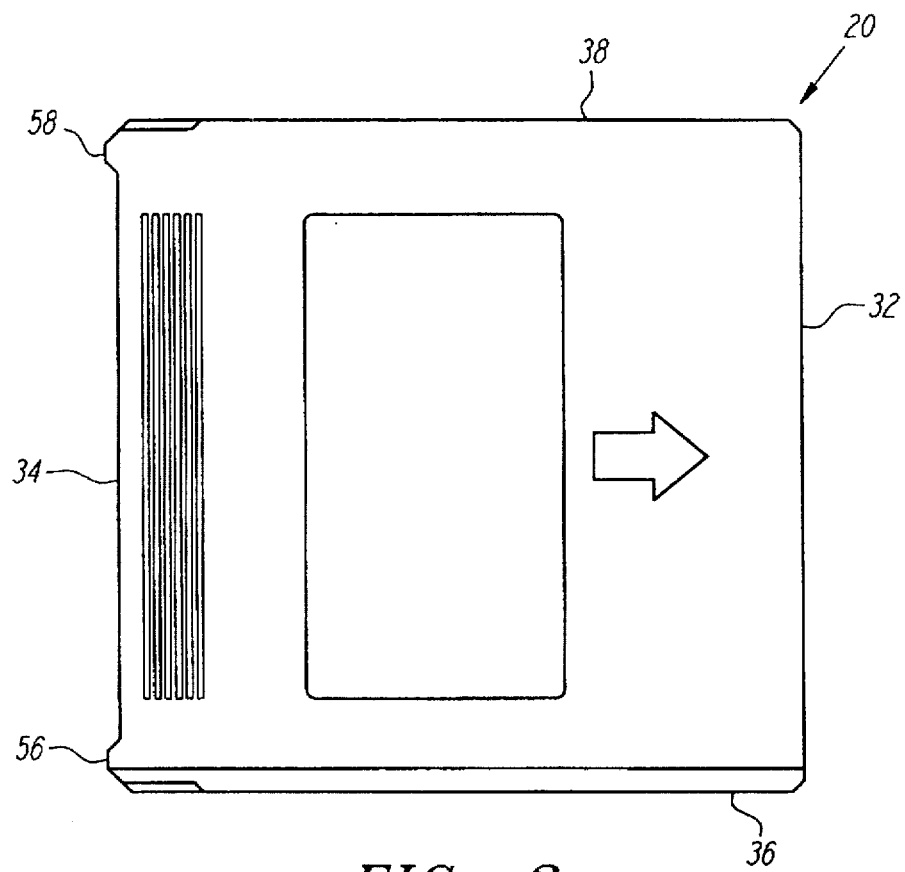
FIG. 3 shows a plan view of the cartridge of FIG. 1.
Figure 4:
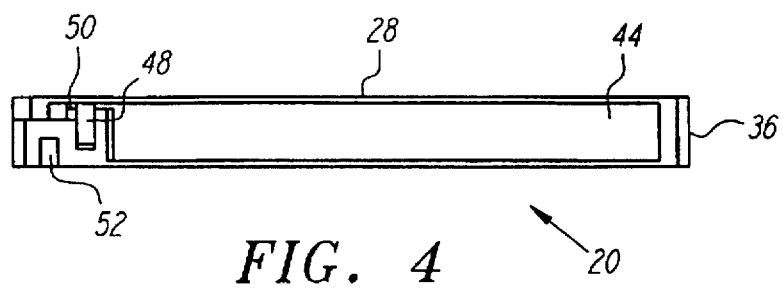
FIG. 4 shows a door end view of the cartridge of FIG. 1.
Figure 5:
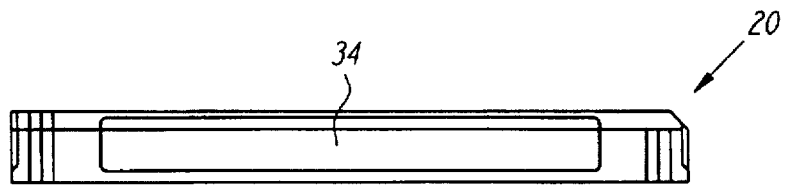
FIG. 5 shows a back end view of the cartridge of FIG. 1.
Figure 6:
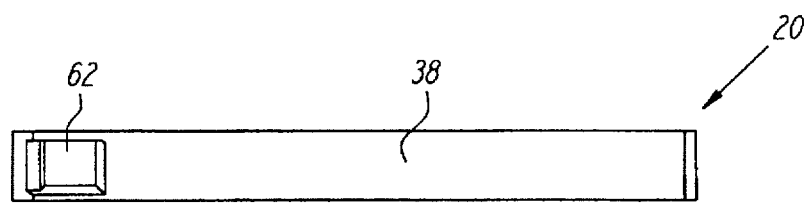
FIG. 6 shows a right end view of the cartridge of FIG. 1.
Figure 7:
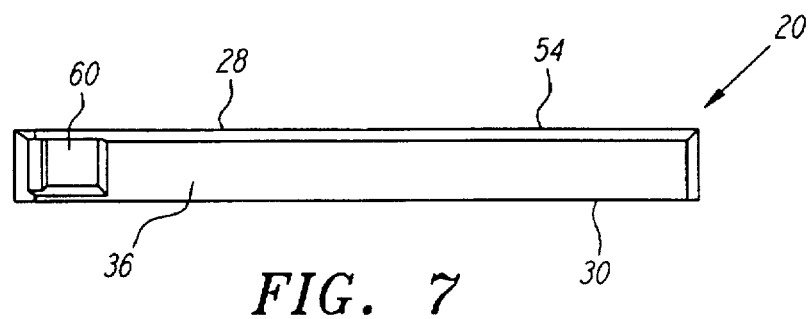
FIG. 7 shows a left end view of the cartridge of FIG. 1.

The port end 32 defines a port 40, which provides access to the disk 42. As further described below, the port 40 allows read/write transducers to be carried by rotary actuator arm to the disk 42 contained in the cartridge 20. In a preferred embodiment, the cartridge 20 includes a single disk 42, which is about 3.5 inches in diameter and can hold 230 megabytes of data on its two planar surfaces. In another preferred embodiment, the planar surfaces of the disk 42 contain one or more calibration tracks with alternating servo burst patterns for removing offset caused by magnetic distortion as disclosed in U.S. Pat. No. 5,400,201 assigned to the assignee of the present invention and fully incorporated herein by reference. As can be seen in FIGS. 1 and 2, the cartridge door 44 is mounted adjacent the port 40 such that the door 44 can be adjusted from a closed position completely closing off the port 40, to a partially or semi-opened position, and finally to a fully opened position. In a preferred embodiment, the door 44 is comprised of LEXAN 920. In a more preferred embodiment, a stainless steel, substantially rectangular portion comprises the majority of the door 44.

Figure 8:
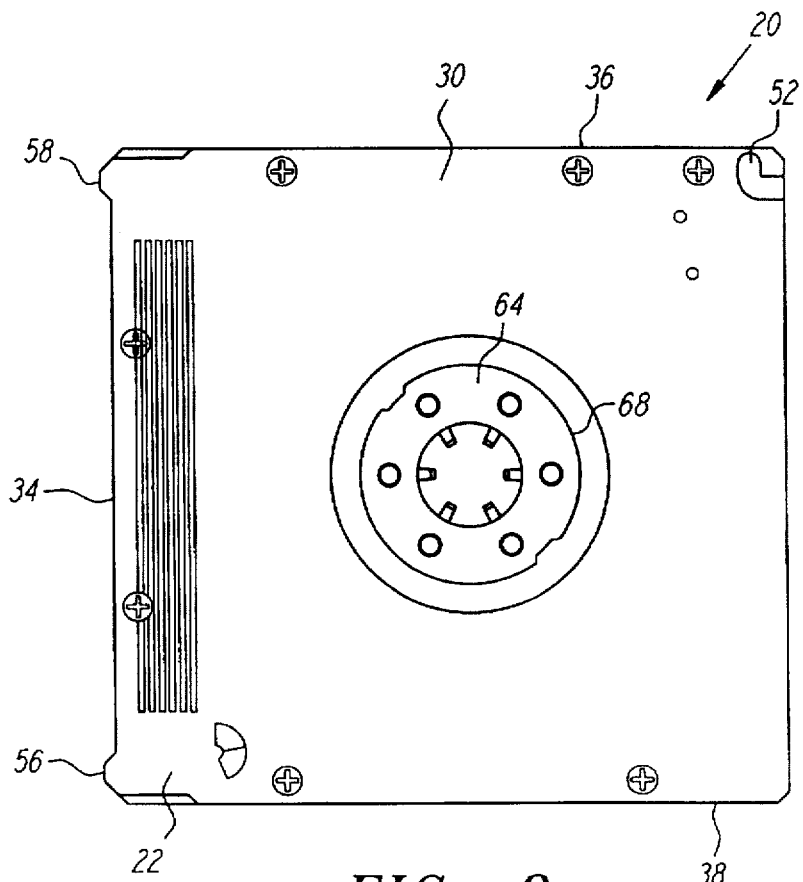
FIG. 8 shows a bottom plan view of the cartridge of FIG. 1.

Referring again to FIGS. 1 and 2, immediately adjacent and to the left of the door 44 is an L-shaped slot 46, which allows access to a door mounting mechanism 48 and a door locking mechanism 50. Referring also to FIG. 8, immediately below the L-shaped slot 46 is a J-shaped groove 52. The J-shaped groove 52 extends through the door end 32 and then rearwardly and outwardly. The J-shaped groove 52 accepts a member from the disk drive in order to have the cartridge 20 interlockingly received into the disk drive. A door opening finger, described in greater detail below, is mounted inside the disk drive. When the cartridge 20 is inserted into the drive, the door opening finger projects into slot 46 and operates a door opening mechanism to open the door 44. When it is desired to remove the cartridge 20 from the disk drive, the cartridge 20 is ejected from the drive as will be further explained below. As the cartridge 20 is being ejected, the door opening finger is automatically removed from slot 46. As this occurs, the door 44 pivots to the closed position as shown in FIG. 1.

Adjacent the L-shaped slot 46 and opposite the J-shaped groove 52 and defined through the top surface 28 and the first end 36 is a beveled portion 54, which extends the length of the first end 36. The beveled portion 54 is compatible with a slanted portion of the disk drive door opening which receives the cartridge 20, thereby ensuring that the cartridge 20 is inserted into the disk drive in the proper orientation. This also ensures that the cartridge 20 is properly registered in the disk drive so that the aforementioned read/write transducer heads can access the disk 42.

With reference to FIGS. 1, 2, 3 and 8, the cartridge 20 includes tabs 56, 58 which extend from the back end 34 of the housing 22. These tabs 56, 58 ensure that the length of the cartridge 20 from the door end 32 to the back end 34 is longer than the width of the cartridge 20, which is defined as the distance between the first and second ends 36, 38. Thus, the cartridge 20 cannot be inserted sideways into the disk drive. The housing 22 further defines first and second recesses 60, 62 which can be used to grab the cartridge 20, either manually or with mechanical fingers, as, for example, when selecting the cartridge 20 from a library and inserting the cartridge 20 into the disk drive.

The cartridge 20 has been designed to maximize the size of the port 40 and to advantageously position the door 44 in the door-open position so that the rotary actuator arm and read/write heads of the disk drive have maximum exposure to the disk 42 contained in the cartridge 20. To this end the door 44 has been designed to be received substantially above and in a plane parallel to the disk 42. Further, the door 44 is received in the open position substantially within the housing 22 of the cartridge 20. Thus, this design does not add to the overall length of the cartridge 20 with the door 44 in the open position and, accordingly, reduces the length of the cartridge receiver in the disk drive. With the door 44 received in the cartridge 20, the pivot point of the rotary actuator arm, which is fixed to the disk drive, can be positioned closer to the center of rotation of the disk 42. This provides for a compact design and optimizes the performance of the read/write heads with respect to the data tracks on the disk 42. The reason for this is that with a rotary actuator arm, the angle with respect to which the head addresses the various tracks is more consistently tangential across the range of tracks. And, further, the geometry of the actuator arm in relation to the disk 42 causes the heads to fly above the disk 42 at a more constant flying height, thereby increasing the accuracy of the read/write operation of the heads. Additionally, with the door 44 fully received in the open position in the cartridge 20, there is less possibility that damage can be done to the door 44 as it is being received into the disk drive.

In order to further maximize the size of port 40, the L-shaped slot 46 is located to the left of the port 40. Immediately adjacent the L-shaped slot 46 is the beveled surface 54, and immediately there below through the bottom surface 30 is defined the J-shaped groove 52. With the L-shaped slot 46, the beveled surface 54, and the J-shaped groove 52 so positioned, the door 44 can extend rightwardly therefrom substantially the full length of the door end 32, to a position immediately adjacent the connecting side 38. The beveled surface 54 extends through the top surface 28 opposite the J-groove 52, allowing the cartridge 20 to be positively registered in the receiver of the disk drive with a member from the drive engaging and lockingly being received in the J-groove 52, and with the beveled surface 54 mating to a matching beveled surface in the cartridge receiver of the disk drive.

As can be seen in FIG. 8, the cartridge 20 includes a hub 64 to which the disk is mounted. Mounted onto the hub 64 is an armature plate 65 that contacts the spindle motor of the disk drive. A portion of the hub 64 and the armature plate 65 is received through a port 66 defined in the bottom surface 30 of the housing 22. Disposed in the hub 64 are a plurality of five downwardly depending teeth 68 that are urged apart as they are received over a spindle hub as is known in the trade.

Figure 10:
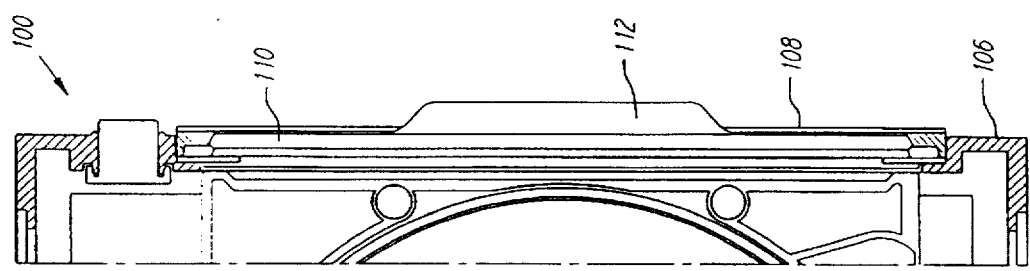
FIG. 10 shows a partial internal plan view of the disk drive of FIG. 9, illustrating the disk drive door and extending tab.
Figure 9:
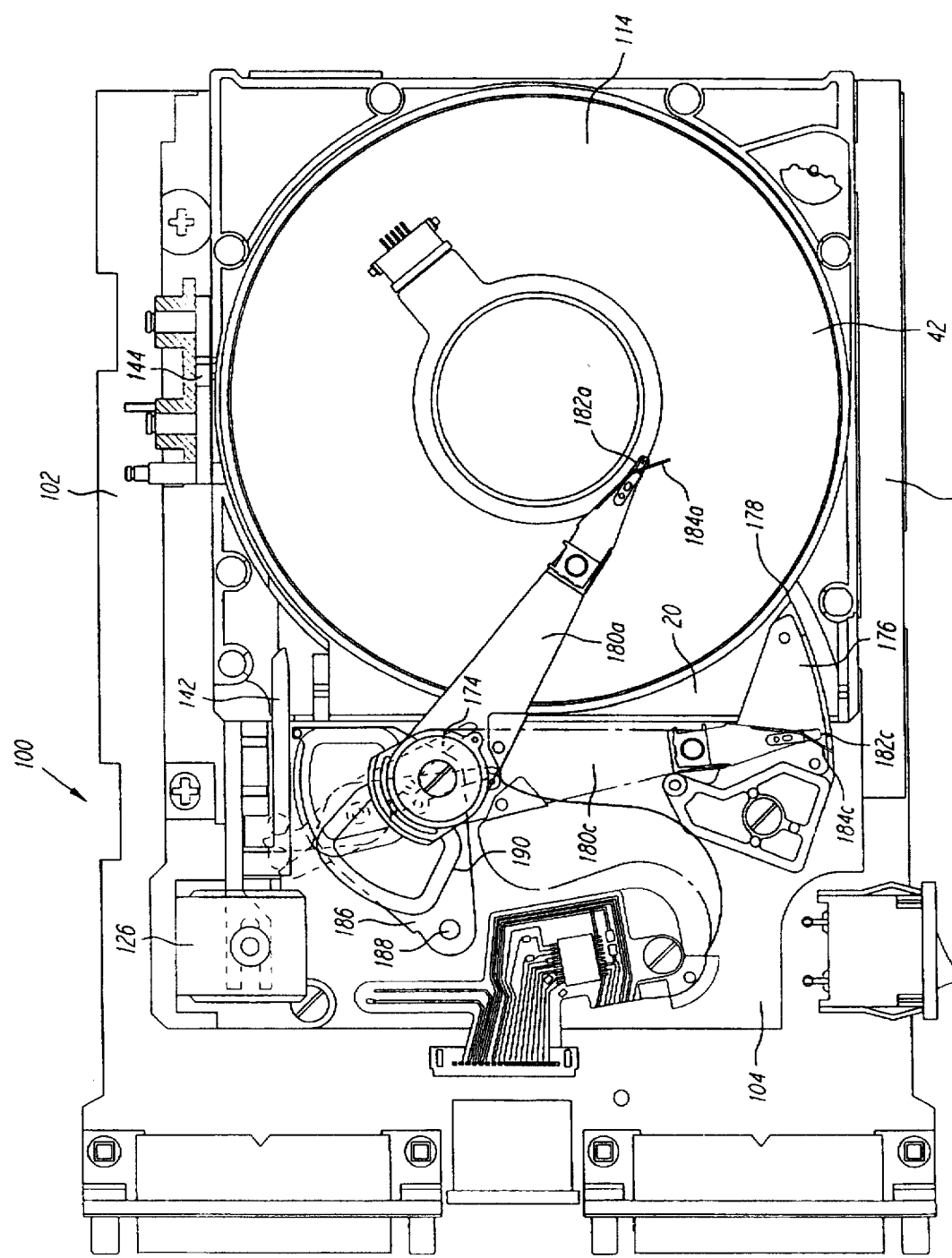
FIG. 9 shows an internal plan view of a disk drive embodying features of the present invention.
Figure 11:
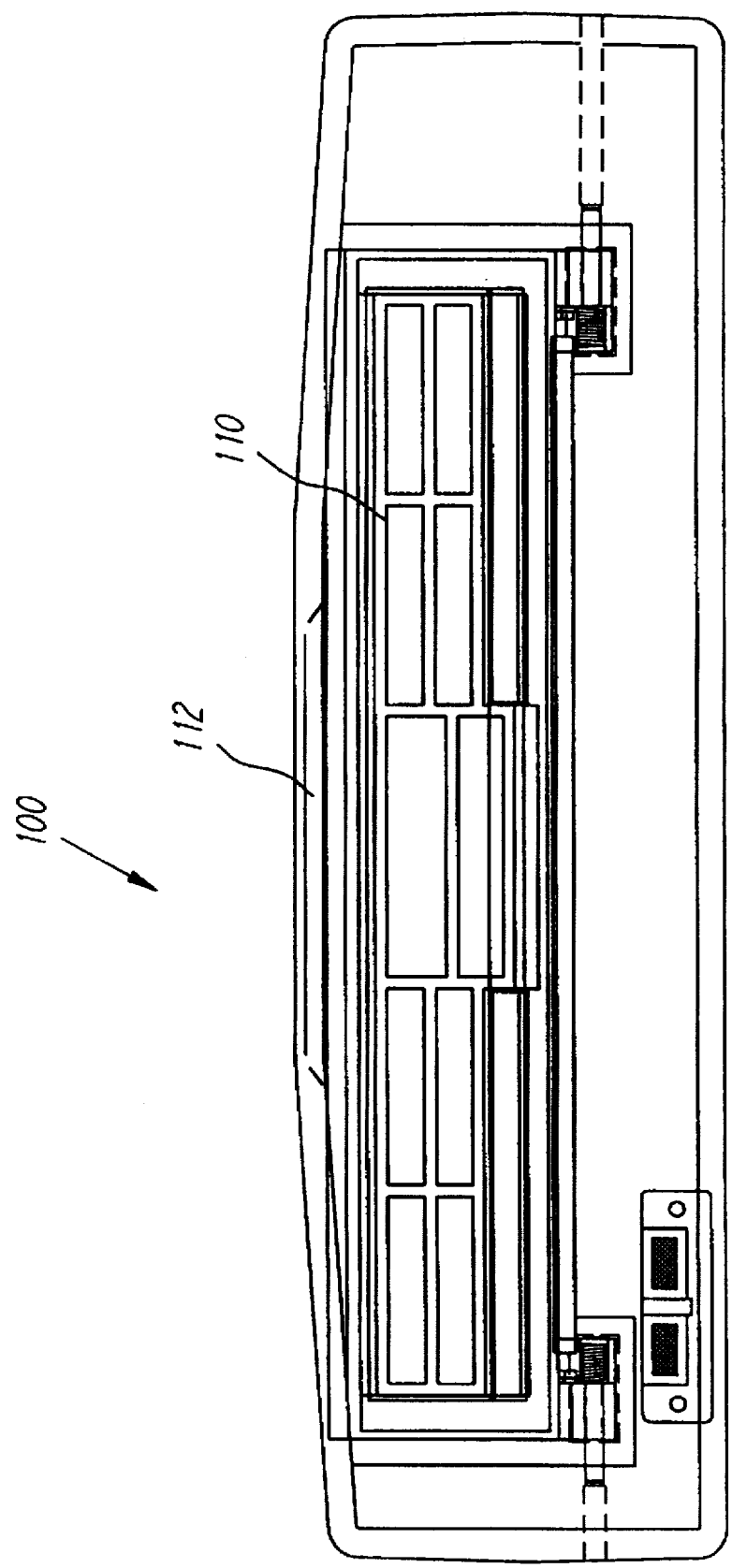
FIG. 11 shows a front end view of the disk drive of FIG. 9.

The disk drive 100 of the present invention can be seen in FIGS. 9–11. FIG. 9 depicts an internal plan view of an embodiment of the disk drive 100 of the invention. The disk drive 100 includes right and left guides 102, 103 mounted on a baseplate 104. An outer housing (not shown) encloses guides 102, 103 and base plate 104. Base plate 104 supports a spindle motor (also not shown) that contacts the armature plate 65 in cartridge 20 and therefore brings the disk 42 contained in the cartridge 20 up to full rotational speed. In a preferred embodiment, the right and left guides 102, 103 are made of a polytherimide resin material, and the base plate 104 is made of flat ground steel.

As shown in FIG. 10, the disk drive 100 further includes a front panel or bezel 106 with a cartridge receiver opening 108, through which the cartridge 20 of FIG. 1 is received. A door 110 closes over the cartridge receiver opening 108. Door 110 includes a tab 112 that extends therefrom and can be used to open or close the door 110. The base plate 104, right and left guides 102, 103, and top portion (not shown) define a cartridge receiving area 114.

Figure 16:
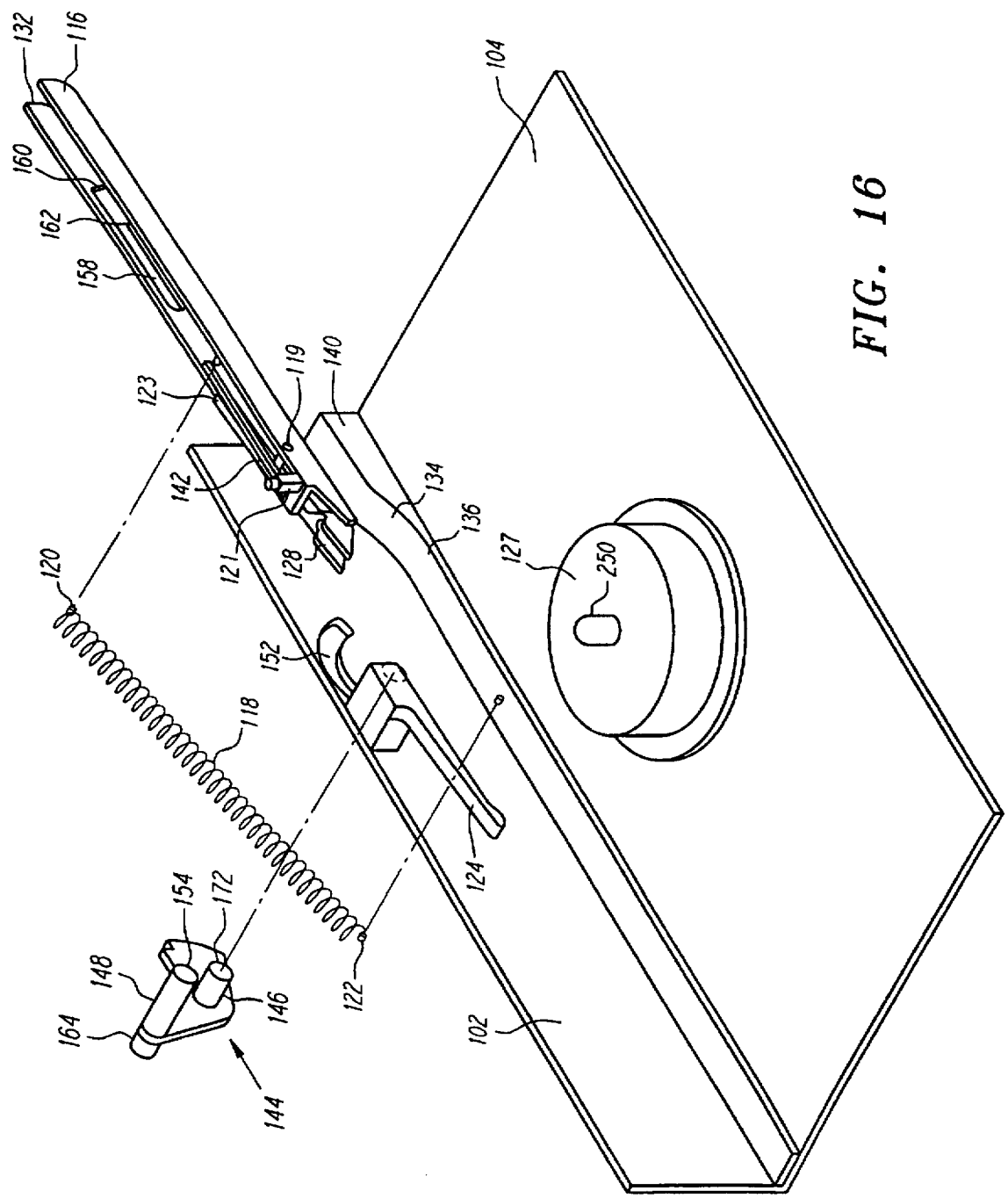
FIG. 16 shows a partial internal exploded perspective view of the disk drive of FIG. 9 taken from the back end, with the left guide and top portion removed.
Figure 17:
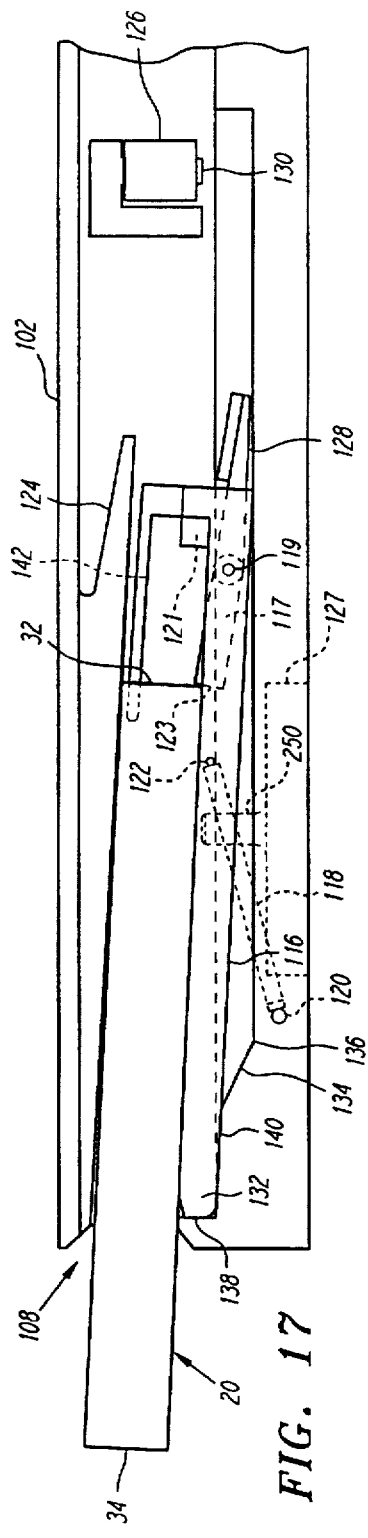
FIG. 17 shows a simplified partial internal right side view of the disk drive of FIG. 9, with the cartridge in a position preceding insertion.
Figure 18:
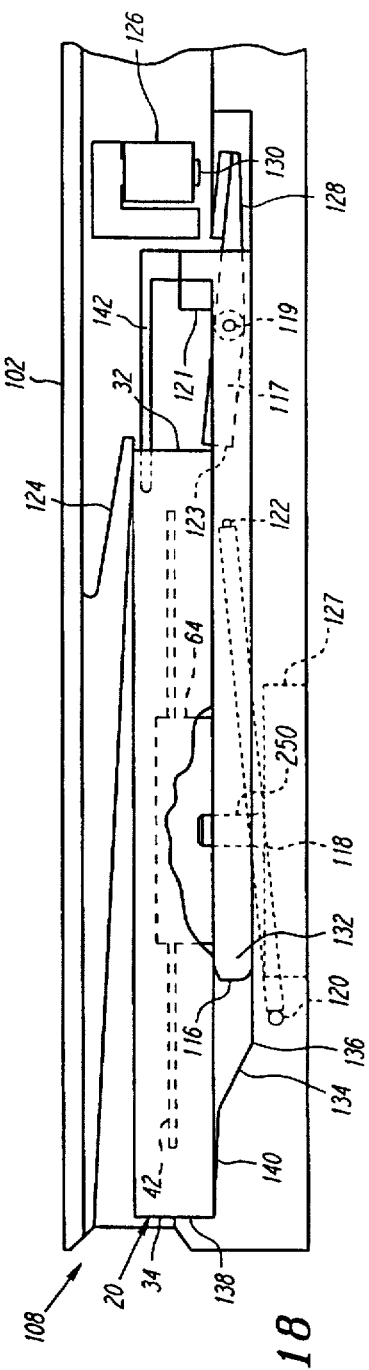
FIG. 18 shows a simplified partial internal right side view of the disk drive of FIG. 9, with the cartridge in a fully inserted position to engage the disk drive.
Figure 19:
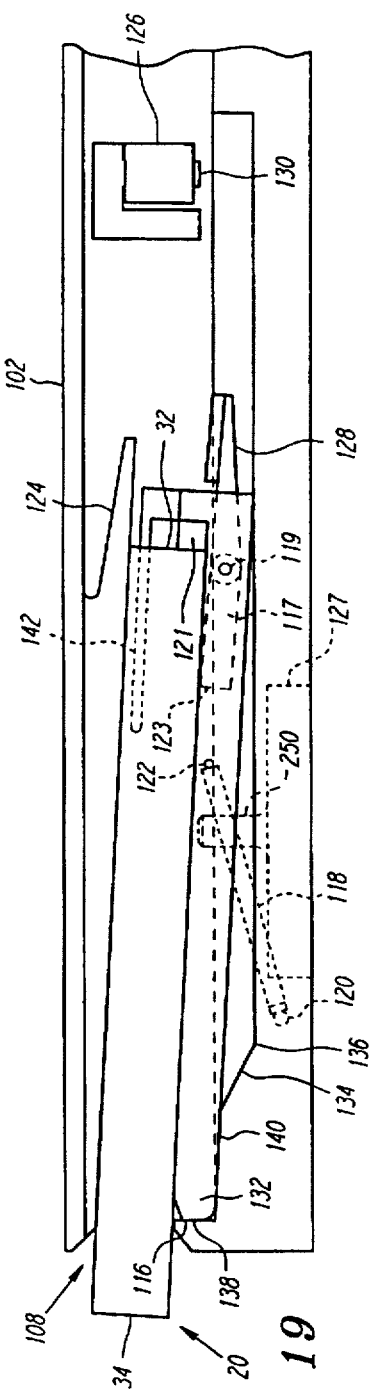
FIG. 19 shows a simplified partial internal right side view of the disk drive of FIG. 9, with the cartridge in a position immediately following ejection from the disk drive.

Referring now to FIGS. 12–19, insertion and ejection of the cartridge 20 into and from the disk drive 100 are characterized. FIGS. 12–15 and 17–19 depict various side views of a disk drive 100 having features of the present invention. In a preferred embodiment, the disk drive 100 includes a slider 116 connected to the right guide 102 and movably affixed thereto by means of a spring 118 as shown in FIGS. 17–19. The spring 118 has a first end 120 connected to the body of the slider 116 and a second end 122 connected to the right guide 102. The slider 116 includes a rubber-padded upstanding portion 121. The slider 116 further includes a slider latch 117 pivotally mounted near the front end of the slider 116. The slider latch 117 pivots about an axis of rotation 119 that is radial with respect to the slider 116, and is located such that the upstanding portion 121 of the slider 116 is positioned between the forked end 128 of the slider latch 117 and the pivoting axis 119 of the slider latch 117, as shown most clearly in FIGS. 17–19. The slider latch has a forked front end 128 and a back end 123. The slider latch 117 is spring biased to rotate clockwise to the position shown in FIGS. 17 and 18 such that the back end 123 protrudes upward into the plane of insertion of the cartridge 20. As shown by FIG. 16, slider 116 is positioned to ride on an inward extension (not shown) of right guide 102, and moves along the right guide 102 into the drive 100 at a downward angle relative to the surface of the base plate 104. Preferably, the slider 116 is made of a polytherimide resin material.

FIG. 17 depicts the disk drive 100 with the cartridge 20 in a position preparatory to insertion. As can be seen, the cartridge 20 inserts at a downward angle relative to the surface of the base plate 104. At a point where the cartridge 20 has partially entered the drive 100, the port end 32 of the cartridge 20 contacts the back end 123 of the slider latch 117 and urges the slider 116 into motion such that both cartridge 20 and slider 116 move in unison at the aforementioned downward angle. The cartridge 20 is guided by a downwardly sloping member 124 projecting from the top of the right guide 102 and suspended above the slider 116.

FIG. 18 depicts the disk drive 100 with the cartridge 20 fully inserted and locked in, such that hub 64 and armature plate 65 engage the spindle motor 127. A solenoid 126 is affixed to the base plate 104 in the right rear corner of the interior of the drive 100 adjacent the right guide 102 and opposite the cartridge receiver opening 108. The forked front end 128 of the slider latch 117 as shown in FIG. 12 has come into contact with the armature 130 of the solenoid 126. The armature 130 of the solenoid 126 includes one or more spacers 125 positioned below the forked front end 128 of the slider latch 117. Prior to contacting the solenoid 126, the slider 116 achieves a horizontal orientation roughly parallel to the surface of the base plate 104. This is accomplished as the back end 132 of the slider 116 rides down a cam surface 134 on the right guide 102, which cam surface 134 levels out at the point 136. As the forked front end 128 of the slider latch 117 meets the armature 130 of the solenoid 126, the back end 34 of the cartridge 20 drops off of the lip 138 of the cartridge receiver opening 108 and lands on a flat surface 140 of the right guide 102. This transfixes both the slider 116 and the cartridge 20 in place because the cartridge 20 is caught between the lip 138 of the cartridge receiver opening 108 and the back end 123 of the slider latch 117. The cartridge 20 is thereby fully inserted and locked into place in a horizontal position relative to the base plate 104. In this position the disk 42 inside the cartridge 20 is engaged and brought to full rotational speed by spindle motor 127. A spindle 250 of the spindle motor 127 engages the hub 64 of the cartridge 20 so that rotation of the spindle motor 127 causes corresponding rotation of the disk 42 within the locked-in cartridge 20. Additionally, as discussed previously, a door opening finger 142 projecting from the upstanding rubber-padded portion 121 of the slider 116 serves to open the cartridge door 44 as the cartridge 20 is inserted into the disk drive 100.

Figure 25:
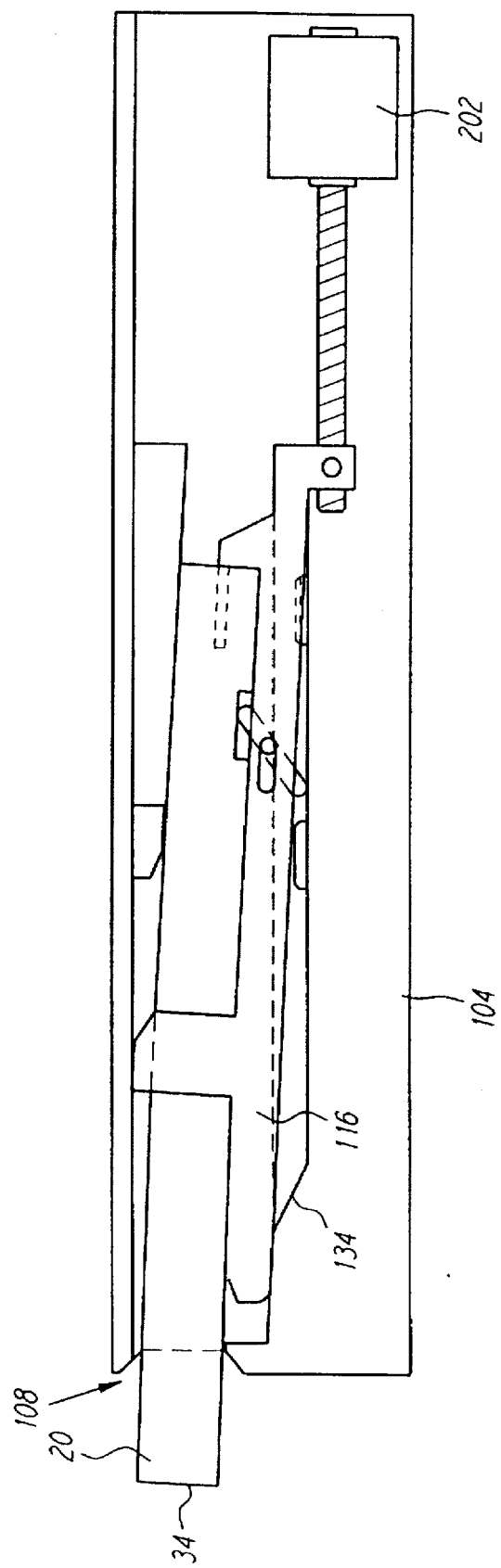
FIG. 25 shows a simplified partial internal right side view of a disk drive that uses an alternative method of cartridge ejection having features of the present invention.

FIG. 19 depicts the disk drive 100 with the cartridge 20 in a position immediately following ejection. The cartridge 20 is ejected when the solenoid 126 is electronically picked, thereby exerting an upward force on the armature 130 and pivoting the slider latch 117 in a counterclockwise direction to the position shown in FIG. 19. This frees the slider 116 such that the spring 118 exerts uncounteracted force on the slider 116 and pulls it toward the cartridge receiver opening 108. As can be seen, the back end 132 of the slider 116 has a cam surface that meets the cam surface 134 of the right guide 102. The back end 132 of the slider 116 is thus urged upward and toward the cartridge receiver opening 108. This serves to lift up the back end 34 of the cartridge 20. At approximately the same time, the front end 32 of the cartridge 20 is contacted by the moving upstanding rubber-padded portion 121 of the slider 116. This imparts momentum to the cartridge 20 in a direction toward the cartridge receiver opening 108. Ultimately, the back end 132 of the slider 116 is met by the lip 138 of the cartridge receiver opening 108, stopping the movement of the slider 116. The momentum of the cartridge 20, which is carried by the slider 116, sends the cartridge 20 to a final resting position in which the back end 34 of the cartridge 20 sticks out from the cartridge receiver opening 108 and can be grasped manually to remove the cartridge 20 from the disk drive 100. As an alternative to using a spring 118 attached to the right guide 103 to drive the ejection motion of the slider 116, the slider 116 may be driven by means of a DC motor 202 as shown in FIG. 25.

Figure 26A:
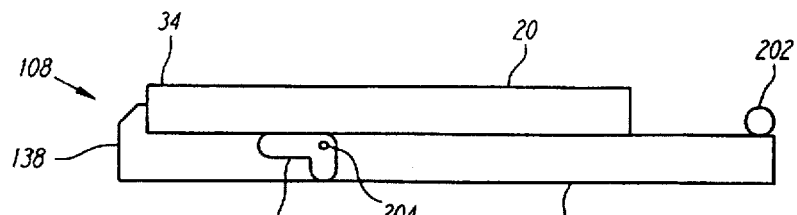
FIGS. 26a and 26b show simplified partial internal right side views of a disk drive comprising another alternative embodiment of the present invention.
Figure 26B:
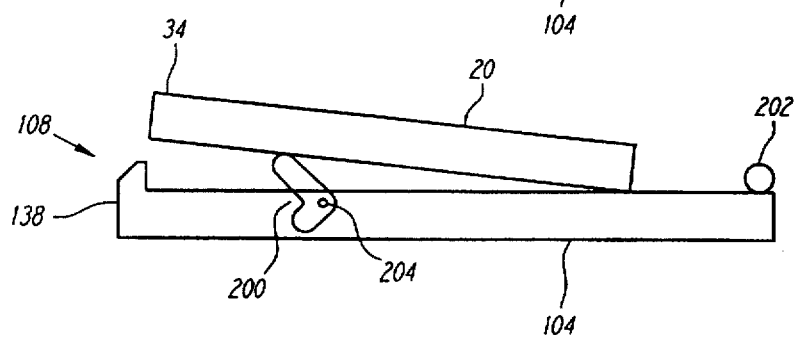
Figure 27A:
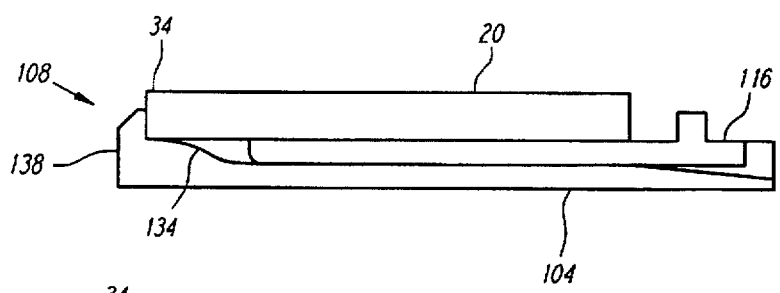
FIGS. 27a and 27b show simplified partial internal right side views of a disk drive comprising yet another alternative embodiment of the present invention.
Figure 27B:
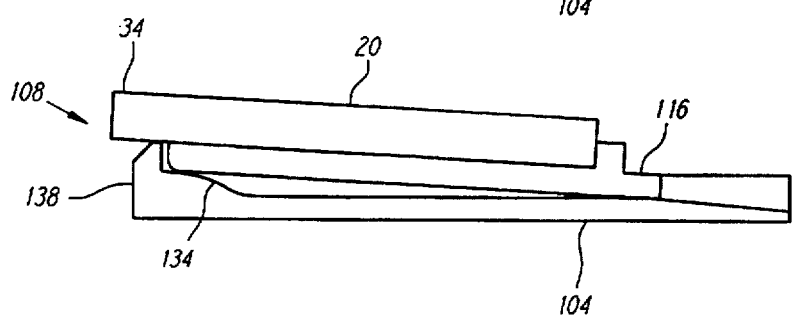

FIGS. 26a and 26b, 27a and 27b, and 28 illustrate three alternative embodiments of an ejection method having features of the invention. FIGS. 27a and 27b depict the movable slider method as previously discussed. In an alternative embodiment of the invention, the removable cartridge 20 can be ejected with a bell crank 200 driven by a DC motor 202 as shown in FIGS. 26a and 26b. The bell crank 200 is located inside the disk drive 100 and below the cartridge 20. As can be seen in FIG. 26b, the DC motor 202 serves to rotate the bell crank 200 about a pivot point 204, thereby exerting an upward force on the bottom surface of the cartridge 20 near the back end 34 of the cartridge 20. This pops the back end 34 of the cartridge 20 upward and over the lip 138 of the cartridge receiver opening 108.

Figure 28:
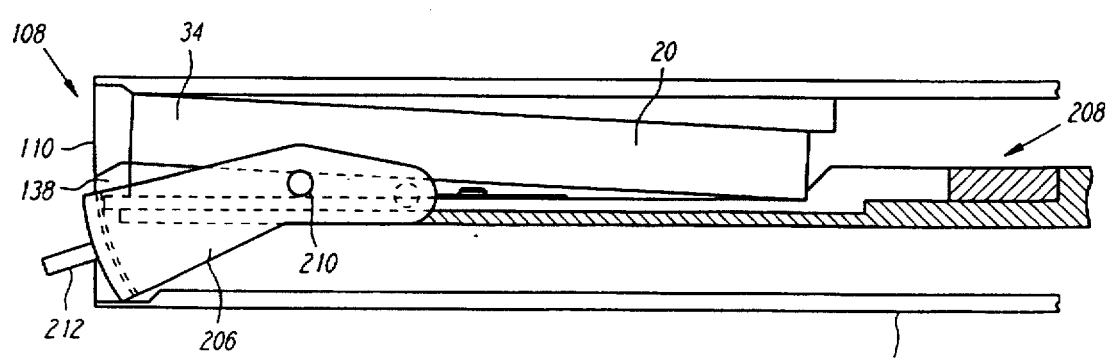
FIG. 28 shows a simplified partial internal right side view of a disk drive comprising yet another alternative embodiment of the present invention.

In yet another alternative embodiment, the cartridge 20 can be ejected by using a geneva stop 206 as shown in FIG. 28. The geneva stop 206 is located inside the disk drive 100 and below the cartridge 20. An eject spring 208 is connected to exert force on the cartridge 20 and urge the cartridge 20 toward the cartridge receiver opening 108. The geneva stop 206 pivots about a pivot point 210 when pressure is applied manually to a tab 212 extending from the geneva stop 206. This pivoting motion applies pressure to the cartridge 20 at a point near the back end 34 of the cartridge 20, thereby lifting the back end 34 of the cartridge 20 up to allow the cartridge 20 to move partially out of the cartridge receiver opening 108. The tab 212 also serves to open the door 110 to the drive 100. Thus, when the door 110 is opened, the back end 34 of the cartridge 20 is lifted to allow ejection of the cartridge 20.

Figure 21:
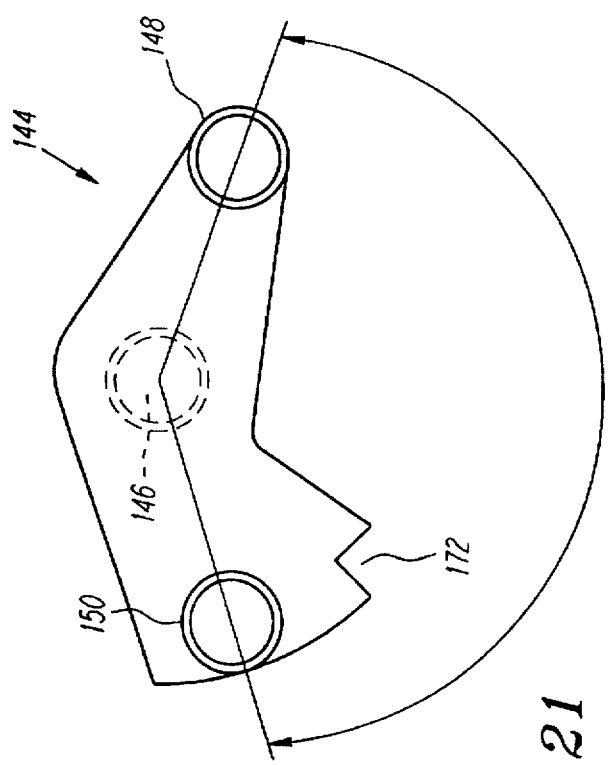
FIG. 21 shows a right side view of the overcenter link of FIG. 19.
Figure 22:
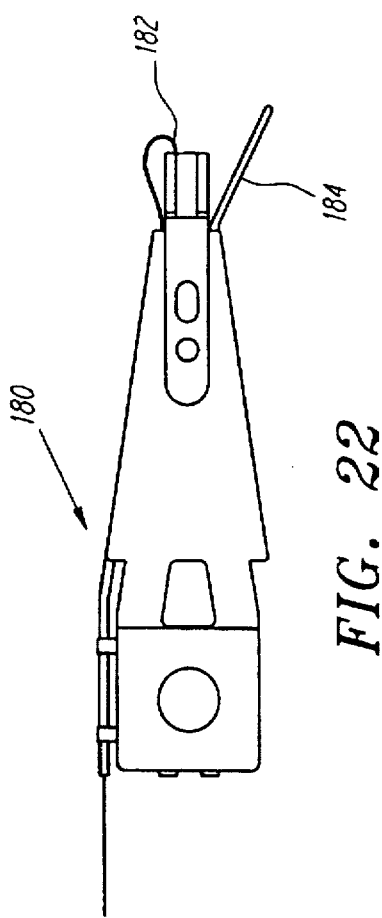
FIG. 22 shows a partial plan view of an actuator arm of the disk drive of FIG. 9, illustrating the load/unload wire.
Figure 20:
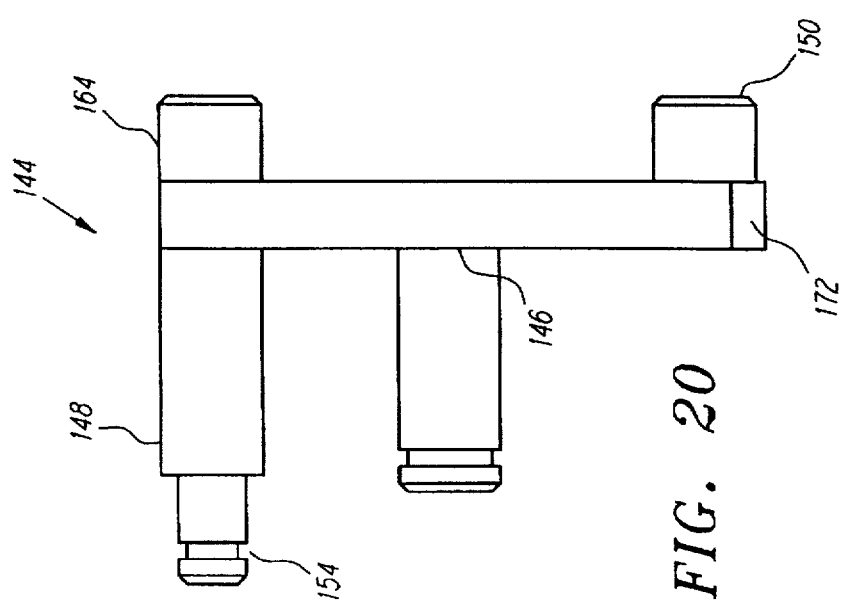
FIG. 20 shows a plan view of an overcenter link component of the disk drive of FIG. 9.

In a preferred embodiment of the invention, the disk drive 100 includes an overcenter link mechanism to hold the cartridge 20 in position in the disk drive 100. FIGS. 20 and 21 depict plan and left side views, respectively, of an overcenter link mechanism 144 having features of the instant invention. Referring to FIGS. 12 and 15, it can be seen that the removable cartridge 20 is locked into a horizontal position roughly parallel to the base plate 104 to engage the disk drive 100 and is held in place by an overcenter link mechanism 144 whose movement is driven by the movement of the slider 116 as the cartridge 20 is inserted into the disk drive 100. Preferably, the overcenter link 144 is made of a polytherimide resin material.

FIG. 12 depicts the overcenter link 144 in a position prior to inserting of the cartridge 20. FIG. 15 shows the overcenter link 144 in the cartridge-inserted position. The cartridge 20 is not shown in FIG. 15 in order to better highlight the internal mechanics of the drive 100. Comparing FIGS. 12 and 15, it is apparent that the overcenter link 144 is mounted to the inside of the right guide 102 so as to pivot about a pivot pin 146 on the right guide 102. The overcenter link 144 includes first and second pins 148, 150, with the first pin 148 disposed in a curved opening 152 located in the right guide 102 above pivot pin 146. Referring now to FIG. 20, attached to a point 154 near the end of the first pin 148 is an overcenter spring (not shown). The overcenter spring runs outside of the right guide 102 such that the right guide 102 stands between the overcenter spring and the overcenter link mechanism 144. The remaining end of the overcenter spring attaches to the bottom outer edge of the right guide 102 at a point (also not shown) on an imaginary straight line that also intersects both the pivot pin 146 and the point 156 where the curved opening 152 is at its maximum distance up from the base plate 104. Thus, the overcenter spring is at its maximum length when disposed on the imaginary straight line. Because the relevant Figures all depict views from within the disk drive 100, the overcenter spring is not shown.

Referring to FIG. 12, when the cartridge 20 is inserted, the motion of the slider 116 causes the overcenter link 144 to rotate in a clockwise direction. The slider 116 is formed with a groove 158 having first and second upwardly sloping surfaces 160, 162. The first upwardly sloping surface 160 is longer than the second upwardly sloping surface 162, and is located closer to the back end 132 of the slider 116. As the slider 116 moves into the disk drive 100, the first upwardly sloping surface 160 contacts the second pin 150 of the overcenter link 144, urging the above-described clockwise rotation. The overcenter link 144 stops rotating at the position shown in FIG. 15. In this position the cartridge 20 lies flat and roughly parallel to the base plate 104 as previously discussed. The cartridge 20 is held in place by the inward portion 164, shown in FIG. 20, of the first pin 148 of the overcenter link 144, which rests above the cartridge 20.

With reference to FIG. 15, when the cartridge 20 is ejected, the motion of the slider 116 causes the second upwardly sloping surface 162 to contact the second pin 150 of the overcenter link 144, which second pin 150 is disposed at a position relatively closer to the base plate 104 than is the position shown in FIG. 12. This contact urges the overcenter link 144 into counterclockwise rotation, thereby freeing the cartridge 20 as the first pin 148 snaps back to the position of FIG. 12.

In a most preferred embodiment of the invention, a switch latch locks the cartridge 20 in the fully inserted position. As shown in FIG. 15, a switch latch 166 is mounted to the inside of the right guide 102 to pivot about a pivot point 168. A plunger switch (not shown) exerts a spring force on the lower corner 170 of the switch latch 166 in the direction of insertion. Prior to insertion, the position of the overcenter link 144 adjacent the switch latch 166 prevents the spring force from rotating the switch latch 166. But after the slider 116 displaces the overcenter link 144, the spring force urges the switch latch 166 into clockwise rotation such that the switch latch 166 engages and locks into a notch 172 of the overcenter link mechanism 144, thereby locking the overcenter link 144 into the cartridge-inserted position. During ejection, the spring 118 attached to the slider 116 exerts a counteracting force sufficient to overcome the spring force on the switch latch 166. Thus, the switch latch 166 is urged into counterclockwise rotation and allows the overcenter link 144 to rotate to the cartridge-ejected position of FIG. 12.

Referring once more to FIG. 9, mounted on the base plate 104 are a voice coil motor 174 and a ramp 176. The voice coil motor 174 is located near the right guide 102 and far enough rearwardly from the cartridge receiver opening 108 that the cartridge 20 can fit completely within the disk drive 100 without coming into contact with the voice coil motor 174. The ramp 176 is fixedly attached to the base plate 104 near the left guide 103 directly across from the voice coil motor 174. A planar surface portion of the ramp 176 projects with a downward slope from a point above the surface of the base plate 104 into the cartridge 20 when the cartridge 20 is fully inserted into the disk drive 100. Thus, the tip 178 of the ramp 176 is located adjacent but not touching the perimeter of the disk 42 contained in the cartridge 20.

Figure 23:
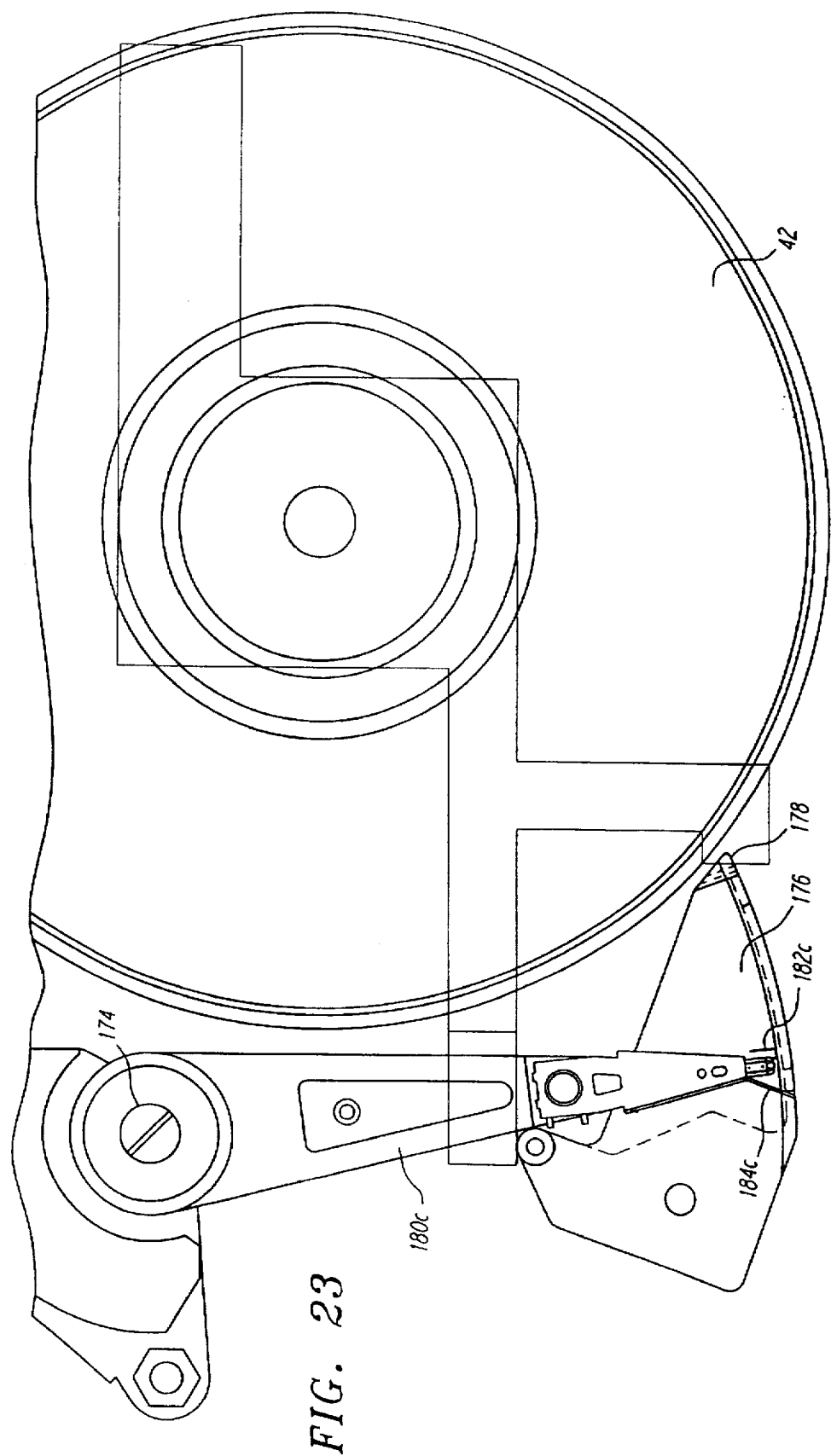
FIG. 23 shows a partial internal plan view of the disk drive of FIG. 9, illustrating the actuator arm in a retracted position.
Figure 24:
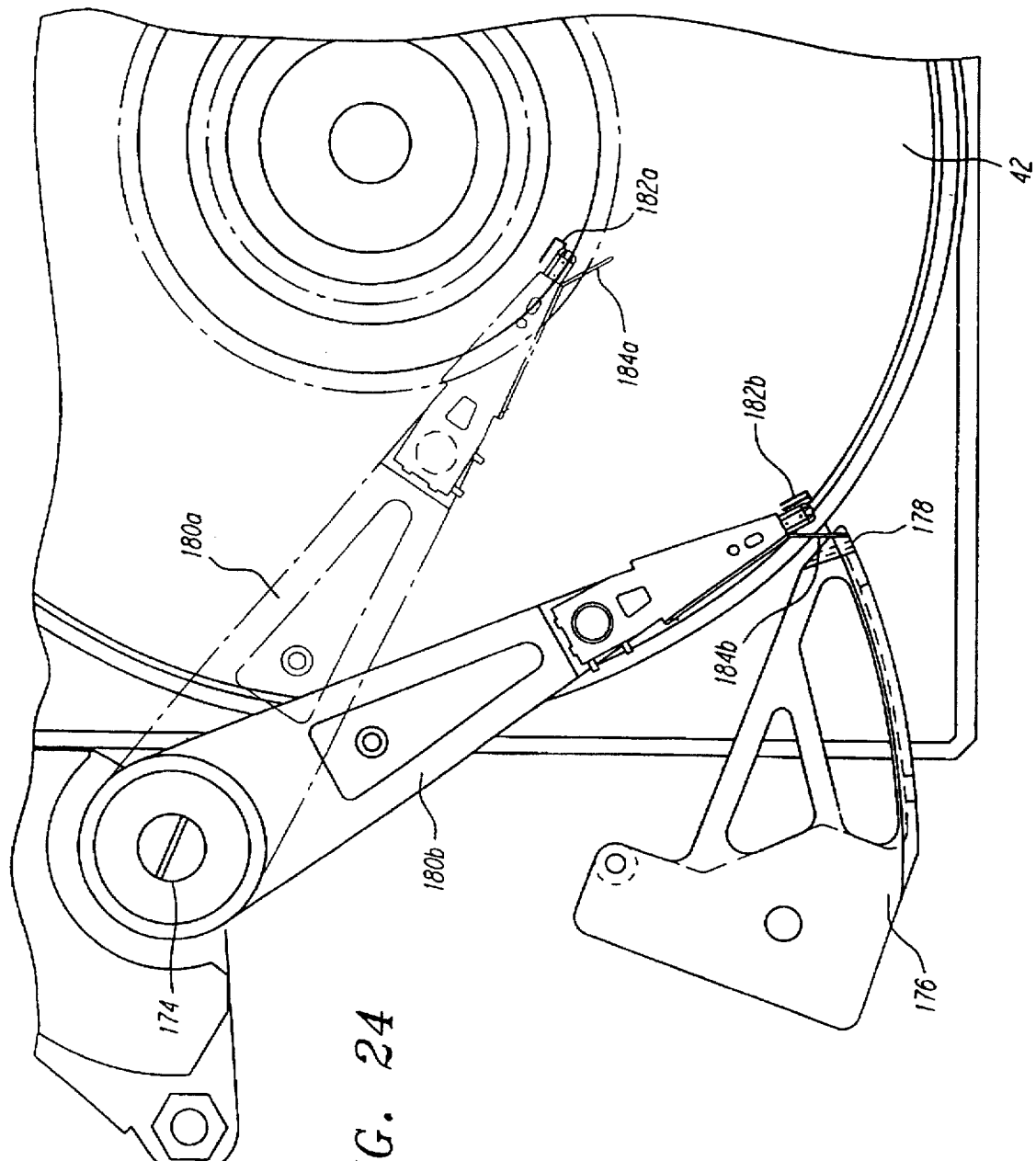
FIG. 24 shows a partial internal plan view of the disk drive of FIG. 9, illustrating the actuator arm in alternate positions (1) interfacing the disk and (2) unloading from the disk onto the ramp.

Referring to FIGS. 9, 23, and 24, an actuator arm 180 is mounted for rotation and pivoted by the voice coil motor 174 as known in the art. Although it is to be understood that the actuator arm 180 can achieve only one position at any given time, FIG. 9 depicts the actuator arm 180 in two possible locations 180a and 180c. Likewise, the actuator arm 180 is shown in two potential positions 180a and 180b in FIG. 24. In position 180a, the actuator arm 180 is fully loaded onto the disk 42. Position 180b illustrates the location occupied by the actuator arm 180 both immediately after loading from the tip 178 of the ramp 176 onto the disk 42, and just prior to unloading from the disk 42 onto the tip 178 of the ramp 176. In position 180c, as shown also in FIG. 23, the actuator arm 180 is rotated to a fully unloaded position on the ramp 176 completely outside the perimeter of the disk 42.

Rotary actuator arm 180 is driven by the voice coil motor 174 with the aid of a retractor link mechanism (not shown) as known in the art. The retractor link mechanism is operably connected to movement of the slider 116 by a pin (not shown) that extends from the voice coil motor 174 and is urged into rotation by the movement of the slider 116. A spring (not shown) connected between the pin and the retractor link mechanism is stretched by the rotation of the pin. The pin snaps back after the slider 116 passes by, rendering the actuator arm 180 free to swing over the surface of the disk 42. Thus, in the event of an emergency, the actuator arm 180 immediately retracts to the position 180c of FIG. 23 upon movement of the slider 116.

The actuator arm 180 carries one or more read/write transducers or heads 182 for reading data from or writing data to the surface of the disk 42 contained in the cartridge 20. Transducer 182 is shown in positions 182a, 182b, and 182c corresponding to the placement of the actuator arm 180a, 180b, and 180c. The read/write transducer 182 is loaded onto the disk 42 from the fixed ramp 176 attached to the base plate 104 of the drive 100 (or, likewise, the transducer 182 is unloaded from the disk 42 onto the fixed ramp 176) with a bent load/unload wire 184 (shown in corresponding positions 184a, 184b, and 184c) attached to the actuator arm 180 adjacent the transducer 182. Because the load/unload wire 184 is bent, a fixed ramp 176 can be used in drive 100 in lieu of a conventional movable ramp. During the loading operation, the bent load/unload wire 184 remains in contact with the fixed ramp 176 as actuator arm 180 moves the transducers 182 off the ramp 176 and out over the surface of the disk 42. Adequate separation between the transducers 182 themselves, and the transducers 182 and the disk 42 surfaces, is thus maintained, enabling the loading operation to proceed without head crashes. Similarly, during unloading, the bent load/unload wire 184 projects outside the perimeter of the disk 42 to contact the fixed ramp 176 as the transducers 182 approach the outer diameter of the disk 42, again allowing adequate separation between the transducers 182 and disk 42 surfaces to be maintained while the unloading operation proceeds.

With reference to FIG. 9, in another preferred embodiment of the invention, the voice coil motor 174 of the disk drive 100 supports an actuator plate 186 also supported by a stand-off (not shown) preferably made of plastic. A screw 188 runs through the stand-off and connects the actuator plate 186 to the base plate 104. The screw 188 can be loosened to allow the stand-off to be turned, thereby adjusting the angular orientation of the voice coil motor 174. This allows the actuator arm 180 to rotate far enough to carry the transducer 182 completely outside the interior of the removable cartridge 20. This feature of the invention decreases manufacturing cost by utilizing one actuator plate 186 instead of both a top plate and a bottom plate. Further, the clamp magnet 190 of the voice coil motor 174 can be skewed so as to allow even more angular motion for the voice coil motor 174. Additionally, air filters (not shown) are placed in the spindle motor 127 so that the pressure differential in the spindle area caused by the spinning action of the disk 42 results in a flow of clean air from the bottom of the baseplate 104 to the top of the disk 42 to continuously purge the inside of the disk drive 100 of contaminants.

In operation of the disk drive 100, the removable cartridge 20 is inserted into the drive 100 at an angle relative to the base plate 104 of the drive 100. The cartridge 20 contacts the movable slider 116, which travels in unison with the cartridge 20 until the cartridge 20 achieves a horizontal orientation roughly parallel to the base plate 104, whereby disk 42 inside cartridge 20 engages the spindle motor 127 of the drive 100. The overcenter link 144 locks the cartridge 20 into place and the spindle motor 127 brings the disk 42 to full rotational speed. The cartridge door 44, which has been opened due to the penetration of the door opening finger 142 on the slider 116, allows the transducer 182 to access the disk 42. The voice coil motor 174 causes the rotary actuator arm 180 to load transducer 182 from the fixed ramp surface 176 onto the disk 42. After read/write functions cease, transducer head 182 is unloaded from the disk 42 to the fixed ramp 176 with the aid of the bent load/unload wire 184. The voice coil motor 174 then retracts the actuator arm 180. The solenoid 126 is picked and thus releases the forked front end 128 of the slider latch 117 on the movable slider 116, allowing the slider 116 to move toward the door 110 of the disk drive 100. The curved back end 132 of the slider 116 rides up the cam surface 134 of the disk drive 100. At about the same time, the rubber-padded upstanding portion 121 of the slider 116 contacts the back end 32 of the cartridge 20. Imported by the movable slider 116, the removable cartridge 20 is ejected from the disk drive 100 at an angle relative to the base plate 104 of the disk drive 100.

While what has been described are preferred embodiments of this invention, it will be obvious to those skilled in the art that numerous alterations may be made without departing from the spirit or scope of the invention.

Therefore, the invention is not to be limited except in accordance with the following claims.

What is claimed is:

1. A disk drive adapted to receive a removable cartridge containing a data storage disk, said disk drive comprising:
   a base plate;
   a spindle motor connected to said base plate and adapted to engage the removable cartridge and rotate the data storage disk contained in the removable cartridge;
   an actuator arm movably mounted to said base plate, said actuator arm including at least one read/write head;
   first and second guides connected to said base plate; and
   a slider adapted to support the removable cartridge containing the data storage disk as the cartridge is inserted into said disk drive, said slider connected to said first guide for movement along said first guide, first at an angle relative to said base plate, and then substantially parallel to said base plate.

2. The disk drive of claim 1, wherein said slider is used alternatively to insert or eject the removable cartridge into or from said disk drive.

3. The disk drive of claim 1, wherein said first and second guides are located at opposing sides of said base plate and said first guide includes a cam surface that supports said slider, said disk drive further comprising a door, said door, said first and second guides, and said base plate defining a cartridge receiving area, said first and second guides including first and second members angled toward said base plate at substantially said angle at which the removable cartridge is received into said disk drive.

4. The disk drive of claim 3, wherein said slider includes first and second ends, said second end having a curved surface, and wherein said slider is oriented so that said second end is situated proximate said door.

5. The disk drive of claim 4, further comprising a slider latch pivotally connected to said first end of said slider to rotate about an axis of rotation, said slider latch having a forked end, and said slider latch being biased so that said forked end is urged toward said base plate.

6. The disk drive of claim 5, wherein said slider further comprises an upstanding member situated between said forked end of said slider latch and said axis of rotation of said slider latch, said upstanding member including a finger member projecting from said upstanding member in a direction substantially parallel to an imaginary line connecting said first and second ends of said slider.

7. The disk drive of claim 6, wherein said upstanding member comprises a resilient material.

8. The disk drive of claim 5, further comprising a solenoid mounted to said base plate proximate said first guide and opposite said door in a position allowing said solenoid to engage said forked end of said slider latch when the removable cartridge is fully inserted into said disk drive.

9. The disk drive of claim 1, further comprising a biasing element connecting said slider to said first guide.

10. The disk drive of claim 9, wherein said biasing element comprises a spring.

11. The disk drive of claim 1, further comprising a geneva stop mechanism connected to said slider.

12. The disk drive of claim 1, further comprising a DC motor that drives a bell crank connected to said slider.

13. The disk drive of claim 1, further comprising an overcenter link pivotally mounted to said first guide to rotate in a plane substantially parallel to said first guide.

14. The disk drive of claim 13, wherein said first guide further comprises a curved opening, said slider further comprises a groove having first and second edges, and said overcenter link includes a first extension slidably engaging said curved opening and a second extension positioned to come into contact with said first edge of said groove during insertion of the removable cartridge into said disk drive and with said second edge of said groove during ejection of the removable cartridge from said disk drive.

15. The disk drive of claim 14, further comprising a door, and wherein said first edge of said groove is longer than said second edge of said groove, and said first edge of said groove is located between said second edge of said groove and said door when the removable cartridge is fully inserted into said disk drive.

16. The disk drive of claim 14, wherein said first extension of said overcenter link presses on the removable cartridge, thereby holding the removable cartridge in place when the removable cartridge has achieved a fully inserted position, said disk drive further comprising an overcenter link biasing element disposed between said overcenter link and said first guide.

17. The disk drive of claim 13, wherein rotational motion of said overcenter link is driven by motion of said slider during insertion of the removable cartridge into said disk drive and during ejection of the removable cartridge from said disk drive.

18. The disk drive of claim 13, further comprising a switch latch, said switch latch being pivotally mounted to said first guide and biased to rotate so as to lock said overcenter link when the removable cartridge is in a fully inserted position in said disk drive, said switch latch being prevented from rotating by said overcenter link prior to insertion of the removable cartridge into said disk drive.

19. The disk drive of claim 18, wherein said switch latch further comprises a notch that engages and locks into place said overcenter link when the removable cartridge has achieved a fully inserted position, after said overcenter link has been rotationally displaced by said slider and has freed said switch latch to rotate.

20. A disk drive adapted to receive a removable cartridge containing a data storage disk, the removable cartridge including a cartridge door, said disk drive comprising:
   a base plate;
   a spindle motor connected to said base plate and adapted to engage the removable cartridge and rotate the data storage disk contained in the removable cartridge;
   an actuator arm movably mounted to said base plate, said actuator arm including at least one read/write head mounted for reading data from and writing data to the data storage disk contained in the removable cartridge;
   first and second guides connected to said base plate; and
   a slider adapted to support the removable cartridge as the cartridge is inserted into said disk drive, said slider connected to said first guide for movement along said first guide, said slider comprising an upstanding portion and a door-opening finger member extending from said upstanding portion, said finger member serving to open the cartridge door during insertion of the cartridge into said disk drive, thereby providing said at least one read/write head on said actuator arm with access to the data storage disk contained in the cartridge.

21. A method of inserting a removable cartridge containing a data storage disk into a disk drive so that a spindle motor of the disk drive can engage the removable cartridge and bring the data storage disk to full rotational speed for read-write access by the disk drive, the disk drive including a door and a base plate, the disk drive further including a movable slider mounted therein, the disk drive further including a locking mechanism mounted therein, said method comprising the steps of:

- biasing the movable slider within the disk drive toward the door of the disk drive;
- pressing the removable cartridge into the disk drive until an edge of the removable cartridge contacts the movable slider of the disk drive, thereby causing the slider to start moving against the force of the biasing element; and continuing said pressing step until the slider is trapped by the locking mechanism within the disk drive and the slider and the removable cartridge achieve a fully inserted position parallel to a base plate of the disk drive.

22. The method of claim 21, wherein said continuing step comprises actuating a solenoid to trap the slider within the disk drive.

23. A method of ejecting a removable cartridge containing a data storage disk from a disk drive, the disk drive including a door having a lip, the disk drive further including a movable slider mounted therein, the disk drive further including a locking mechanism mounted therein, said method comprising the steps of:

- biasing the movable slider of the disk drive in a direction toward the door of the disk drive;
- unlocking the locking mechanism within the disk drive, thereby causing the locking mechanism to release the slider to move toward the door;
- striking the removable cartridge with the slider and transporting the removable cartridge toward the door on the slider; and
- retrieving the partially ejected removable cartridge after the movement of the slider has been stopped by the lip of the door.

24. The method of claim 23, wherein the locking mechanism comprises a solenoid and said unlocking step comprises picking the solenoid.

* * * * *